(12) United States Patent  
Oak

(10) Patent No.: US 6,486,970 B1
(45) Date of Patent: Nov. 26, 2002

(54) MULTIFUNCTIONAL APPARATUS FOR TRANSFERRING AND RECEIVING FACSIMILE DATA AND COMMUNICATION DATA BY USING AN INTEGRATED SERVICE DIGITAL NETWORK

(75) Inventor: Seung-soo Oak, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/201,147

(22) Filed: Nov. 30, 1998

(30) Foreign Application Priority Data

Nov. 28, 1997 (KR) .............................. 97-63643

(51) Int. Cl.⁷ .............................................. G06F 12/00
(52) U.S. Cl. .................. 358/1.15; 358/407; 358/434; 379/100.09; 379/100.12; 370/251
(58) Field of Search ................ 358/1.15, 442, 358/434, 407, 468, 402, 403; 379/100.01, 100.08, 100.09, 100.12, 100.13, 93.05–93.07; 370/110.1, 251, 264

(56) References Cited

U.S. PATENT DOCUMENTS

| | | | | |
|---|---|---|---|---|
| 4,755,992 A | * | 7/1988 | Albal | 370/469 |
| 5,138,466 A | * | 8/1992 | Saito | 358/468 |
| 5,323,392 A | * | 6/1994 | Ishii et al. | 370/466 |
| 5,341,377 A | * | 8/1994 | Ohtani | 370/110.1 |
| 5,418,625 A | * | 5/1995 | Shimoosawa | 358/434 |
| 5,461,620 A | * | 10/1995 | Bergler et al. | 370/84 |
| 5,461,662 A | * | 10/1995 | Hanai | 379/9 |
| 5,481,605 A | * | 1/1996 | Sakurai et al. | 379/243 |
| 5,495,485 A | * | 2/1996 | Hughes-Hartogs | 370/110.1 |
| 5,519,702 A | * | 5/1996 | Takahashi | 370/84 |
| 5,541,930 A | * | 7/1996 | Klingman | 370/110.1 |
| 5,581,609 A | * | 12/1996 | Saito | 379/100 |
| 5,673,258 A | * | 9/1997 | Helbig et al. | 370/293 |
| 5,706,287 A | * | 1/1998 | Leimkoetter | 370/410 |
| 5,721,729 A | * | 2/1998 | Klingman | 370/251 |
| 6,181,709 B1 | * | 1/2001 | Helbig et al. | 370/467 |

FOREIGN PATENT DOCUMENTS

EP 920237 * 6/1999 ........... H04Q/11/04

OTHER PUBLICATIONS

Computer Networks, Larry L. Peterson & Bruce S. Davie, Morgan Kaufman Publishers, 2$^{nd}$ Edition, 1996, 2000, pp. 36–38.*

The Communicatiin Handbook, Jerry D. Gibson, CRC Press & IEEE Press, 1997, pp. 570–573, 578, 583–584.*

* cited by examiner

Primary Examiner—Edward Coles
Assistant Examiner—Tia Carter
(74) Attorney, Agent, or Firm—Robert E. Bushnell, Esq.

(57) ABSTRACT

A multifunctional apparatus transfers and receives facsimile data and communication data by using an integrated service digital network constructed with a computer interface conducting facsimile and communication data; a line interface transferring data to the network and receiving facsimile and communication data from the network at the first transfer rate; an ISAC controlling a connection with the integrated service digital network, conducting facsimile and communication data via the network, converting the transfer rate of data received from the network to a second transfer rate, and converting the transfer rate of data received from for the network to the first transfer rate. A serial I/O converts the communication data transmitted from the computer through the computer interfacing section, and facsimile data scanned in a scanning section, into serial data, and transfers serial data to the ISAC, and receives communication and facsimile data from the network via the ISAC.

23 Claims, 2 Drawing Sheets

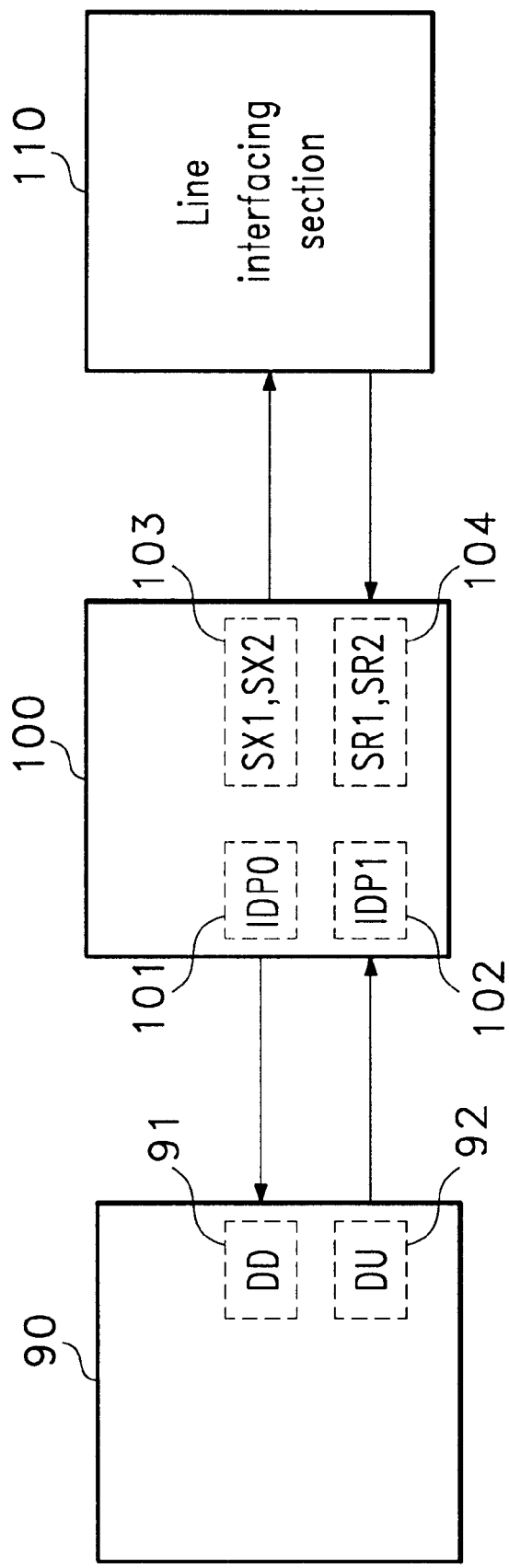

MULTIFUNCTIONAL APPARATUS FOR TRANSFERRING AND RECEIVING FACSIMILE DATA AND COMMUNICATION DATA BY USING AN INTEGRATED SERVICE DIGITAL NETWORK

CLAIM OF PRIORITY

This application makes reference to, incorporates the same herein, and claims all benefits accruing under 35 U.S.C. § 119 from an application for A MULTIFUNCTIONAL APPARATUS FOR TRANSFERRING AND RECEIVING FACSIMILE DATA AND COMMUNICATION DATA BY USING AN INTEGRATED SERVICE DIGITAL NETWORK earlier filed in the Korean Industrial Property Office on the 28$^{th}$ of November 1997 and there duly assigned Ser. No. 63643/1997.

BACKGROUND OF THE INVENTION

Technical Field

The present invention relates to a multifunctional apparatus and, more particularly, to a multifunctional apparatus for transferring and receiving facsimile data and communication data by using an integrated service digital network (ISDN), which transfers and receives the facsimile data by using G3 and G3C types of protocols, and which is connected to a computer so as to print and scan data provided by the computer.

Related Art

Generally, as is well known, a multifunctional apparatus comprises a printer, a scanner, a facsimile device and a copier, referred to as peripherals, which are combined with a computer, and such a multifunctional apparatus has the multiple functions of printing, scanning, facsimile data transferring and copying.

The multifunctional apparatus is connected to a computer by means of a serial port or a parallel port of the computer. The multifunctional apparatus has the functions of printing data, scanning a document and storing document data in a memory of the computer, and transferring facsimile data.

In order to transfer the document data, the multifunctional apparatus scans the document to be transferred and transfers the document data; alternatively, after a document is prepared by means of a word processor, document data can be transferred by means of an application program supporting facsimile transmission. A user must use an interior modem or an exterior modem to communicate by means of a computer with another party.

That is, when the multifunctional apparatus is connected to the computer to transfer and receive data to/from a communication network, there is a disadvantage in that the computer must be provided with a modem.

SUMMARY OF THE INVENTION

The present invention has been made to overcome the above described problem.

It is an object of the present invention to provide a multifunctional apparatus for transferring and receiving not only facsimile data, but also communication data, when connected to an integrated service digital network (ISDN).

To accomplish the above objects of the present invention, there is provided a multifunctional apparatus for transferring and receiving facsimile data and communication data by using an integrated service digital network. The apparatus comprises: a computer interfacing section for receiving dialing information, and for transferring and receiving facsimile data and communication data to/from a computer; a line interfacing section for transferring data to the integrated service digital network, and for receiving the facsimile data and the communication data from the integrated service digital network; an ISDN subscriber access controller (ISAC) for performing layer 1, layer 2, and layer 3 protocols to control connection with the integrated service digital network by using the dialing information, and for transferring and receiving the facsimile data and the communication data to/from the integrated service digital network; and a serial input and output section for converting the communication data transmitted by the computer through the computer interfacing section and facsimile data scanned by a scanning section into serial data, for transferring the serial data in theistic at a second transfer rate, and for receiving and converting the communication data and facsimile data transmitted by the integrated service digital network through the ISAC into serial data at the second transfer rate.

The first transfer rate is about 64 kbps, and is the rate at which the data are transferred and received through the integrated service digital network.

The second transfer rate is about 768 kbps, and is the rate at which the serial data are transferred in the ISAC.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 shows a transmission of data between a serial input and output section, an ISAC, and a line interfacing section of a multifunctional apparatus according to the present invention.

DESCRIPTION OF THE PREFERRED EMBODIMENT

Figure 1:
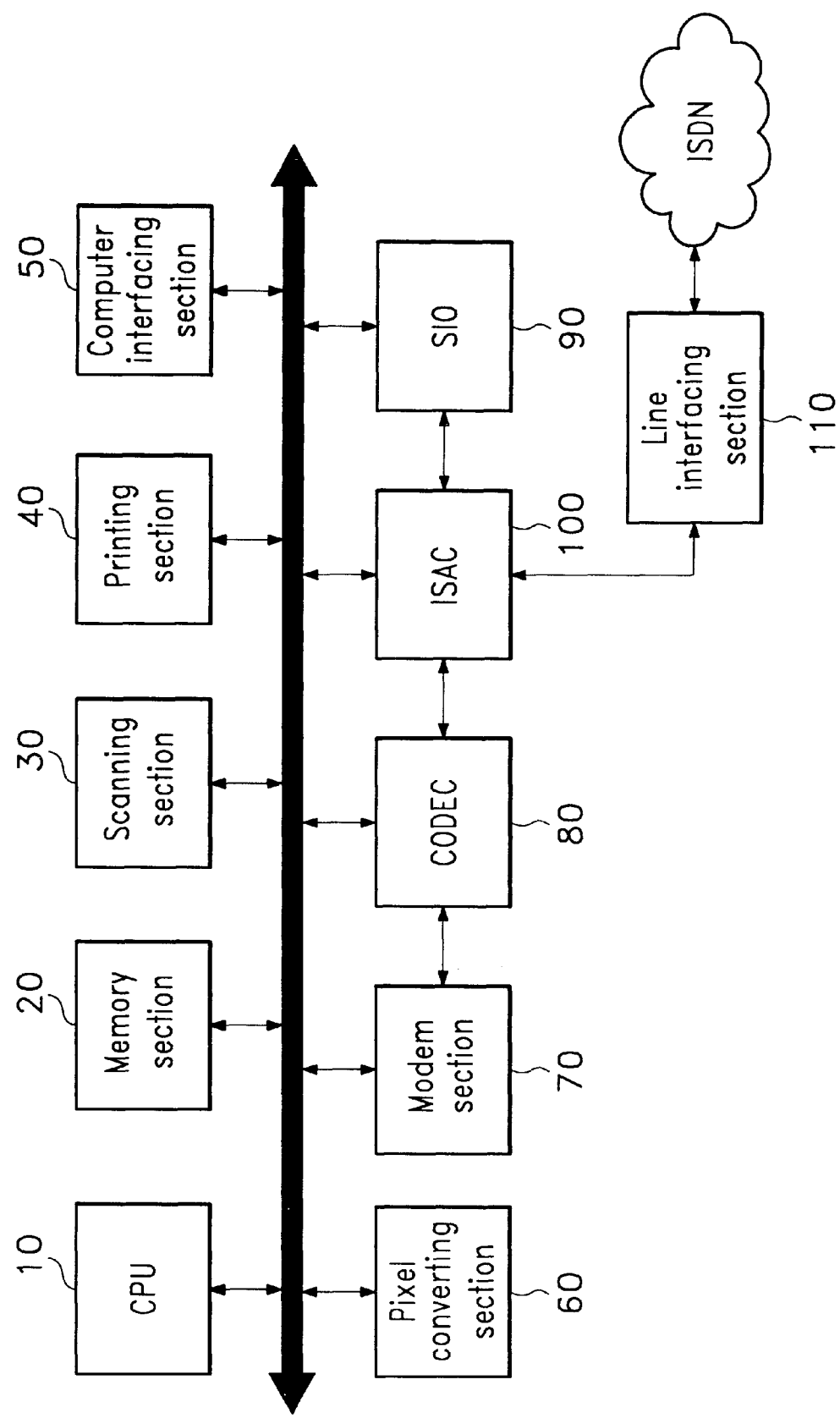
FIG. 1 is a schematic block diagram showing a multifunctional apparatus connected to an integrated service digital network and having a facsimile function according to the present invention.

Hereinafter, an apparatus for transferring and receiving facsimile data and communication data according to the present invention will be described in detail with reference to accompanying drawings.

An integrated service digital network (hereinafter, referred to as ISDN) will be described briefly. The ISDN is a digital type of network supplying voice and non-voice service.

In the ISDN, different data (such as voice, characters, and image data), which are transferred and received through a public switched telephone network, a public switched data network, a telex network and a private facsimile line, are converted into digital data, then and transferred and received.

In analog terms, the public service telephone network provides one channel for a user while, in digital terms, the ISDN provides two channels for the user to have a telephone call and to transfer and receive communication data by simultaneous use of a personal computer and a facsimile device. That is, transmission and reception of data and a telephone call can be performed trough the ISDN without using various types of communication lines.

Furthermore, since the ISDN uses digital signals, there is an advantage in that transmission and reception of the data can be performed at high speed without noise and loss of data.

The ISDN generally has two or three types of channels. That is, the ISDN has a D channel for transferring and receiving control signals, a B channel for transferring and receiving substantial data, and an H channel having six B channels.

Services for connecting with the ISDN can, for example, generally be divided into two types: a primary rate interface (hereinafter, referred to as PRI) and a basic rate interface (hereinafter, referred to as BRI).

The PRI is a first group connecting service, and is mainly available to an internet service it provider and companies for reselling a line. The PRI is generally divided into a European mode using thirty B channels and one D channel, and a North American mode using twenty-three B channels and one D channel.

On the other hand, the BRI is a basic connecting service, and is mainly available to personal subscribers. The BRI includes two B channels and one D channel. Each B channel has a transmission rate of 64 Kbps. The transmission and reception of data and voice communication can be performed simultaneously by utilizing the two B channels and the one D channel. In a case of using the two B channels for voice communication, two telephones can be connected to the BRI.

Another service, such as a facsimile service, can be applied to the ISDN.

FIG. 1 is a block diagram showing a multifunctional apparatus connected to the ISDN and having a facsimile transferring function according to the present invention.

As shown in FIG. 1, a central processing unit or CPU 10 substantially controls the multifunctional apparatus by performing a preset program.

A memory 20 has program data, protocol data, and data relating to transmission and reception of character data. The CPU 10 can access and store the above data in the memory 20.

A scanning section 30 scans data from a document, and converts the document data into digital image data. Then, the scanning section 30 provides the image data to the CPU 10.

A modem 70 is controlled by the CPU 10 to modulate data outputted by the CPU 10 into analog data, or to demodulate received analog data into digital data for provision to the CPU 10.

A printing section 40 prints facsimile data received through the ISDN under control of the CPU 10.

A computer interfacing section 50 connects the multifunctional apparatus with a computer via serial or parallel connections in the same way as peripherals are connected to the computer. The serial connection provides asynchronous communication using a COM port as a serial port of the computer under the RC-232C protocol. The parallel connection is utilized for transferring data in one direction, and used to connect a printer or plotter to the computer.

A pixel converting section 60 converts the image data inputted from the scanning section 30 into data adapted for transmission.

A CODEC 80 converts the analog signals modulated by the modem 70 into digital signals capable of being transferred through the ISDN, or converts digital signals received through the ISDN into analog signals capable of being analyzed by the modem 70.

A serial input/output (SIO) device 90 converts data inputted from the computer or the scanning section so that the data is adapted to the B channel of the ISDN. That is, the serial input/output device 90 converts the data inputted through an inner system bus into serial data, and transfers the serial data to an ISDN subscriber access controller 100 (hereinafter, referred to as ISAC). Moreover, the serial input/output device 90 converts the serial data received from the ISAC 100 into parallel data, and transfers the parallel data through the inner bus to the CPU 10.

The ISAC 100 performs line coding and line activation/deactivation functions as layer 1 functions of the ISDN for the D channel and a line access procedure on the D channel. Furthermore, the ISAC 100 selects and sets a channel, and detects a pathway corresponding to a dialing process and the nature of a reception side device (for example, a facsimile device or a multifunctional apparatus). Continuously, the ISAC 100 identifies the possibility of communication with the reception side device, and transfers and receives data for the ISDN through the line interfacing section 110.

Hereinafter, the protocols will be described in detail.

The layer 1 protocol corresponds to a modular connector having an eight-pin type of shape, which is a physical layer, and is used as a socket, a wave shape of a transferred signal in a subscriber's line, a time division multiplexing access of the B and D channels relating to the subscriber's line, and an adaption control of the D channel in a bus connection.

The layer 2 protocol corresponds to a multiple link access to connect to a data link layer through the bus, and to set a plurality of data link connections on a physical layer. It is referred to as the link access procedure on the D channel. Since the link access procedure on the D channel is based on a high level data link control, a reliable signal can be transferred through the D channel.

The layer 3 protocol corresponds to a series of call messages on the D channel so that communication is performed on a network through the B or D channel. In an exchange of lines, a channel is selected and set during the setting of a call message and a pathway relating to a response to dialing is set. Then, the nature of the reception side device is detected, and the possibility of communication is identified.

In a case of a B channel packer, a selection and a setting of a communication channel and a selection of a reception side terminal is performed through the D channel, and the setting of a call relating to an X.25 is performed through the selected channel.

The ISDN line interfacing section 110 interfaces signals of the ISDN so that digital data in a transmission form are transferred and received while satisfying physical and electrical regulations.

Hereinafter, operations of the multifunctional apparatus according to the present invention will be described in detail with reference to FIGS. 1 and 2.

Connection to an internet is performed through a local area network and a public line network. Connection to the internet through the public line network is achieved in two ways: connection to the internet through the public switched telephone network, and connection to the internet through the integrated service digital network.

Hereinafter, a way of connecting to the other device through the ISDN according to the present invention will be described.

A computer is connected to an internet service provider by dialing a telephone number of the internet service provider by means of a dialing program. The computer performs dialing by using a modem. According to the present invention, however, a computer transfers dialing information to a computer interfacing section 50 through a parallel port.

The CPU 10 controls the ISAC 100 to perform the layer 1, 2 and 3 protocols of the D channel according to the dialing information. The CPU 10 also controls the ISDN line interfacing section 110 so that the multifunctional apparatus is connected to the internet service provider through the ISDN.

Then, when the computer is connected to the internet service provider, the user executes an application program to transfer and receive data to/from the internet service provider. The data is transferred to and received from the internet service provider through a pathway different from that of the dialing information.

That is, when the multifunctional apparatus is connected to the internet service provider through the B channel by the protocol of the D channel, data are transferred between the multifunctional apparatus and the internet service provider via the B channel.

The flow of information is as follows.

Commands for searching information on the internet are transferred from the computer to the multifunctional apparatus through the computer interfacing section 50. The commands are then controlled by the CPU 10 so as to be transferred to the serial input/output device 90 through the inner bus.

The serial input/output device 90 converts the commands into serial data. Then, the serial input/output device 90 transfers the serial data through a data upstream terminal 92 thereof to an input/output module data port (IDPI) 102.

The transmission rate is about 768 kbps which is the same, as the transmission rate of inner serial data in the ISAC 100.

The ISAC 100 changes the serial data transmission rate of 768 kbps to a data transmission rate of 64 kbps. Then, the ISAC 100 outputs the data through transmission connectors SX1, SX2 103, and transfers the data to the internet service provider through the ISDN line interfacing section 110.

On the other hand, data from the internet service provider are received by the ISAC 100 through reception connectors SR1, SR2 104 thereof at a transmission rate of 64 kbps, and are converted by the ISAC 100 into serial data having a transmission rate of 768 kbps. Then, the serial data are transferred to a data downstream (DD) 91 of the serial input/output device 90 through an input/output module data port (IDPØ) 101 of the ISAC 100.

When receiving the serial data, the serial input/output device 90 informs the CPU 10 through an interrupt connector of reception of the serial data. When CPU 10 receives the interrupt request it transfers the data to the computer interfacing section 50 through the data bus. Finally, the computer interfacing section 50 transfers the data to the computer.

As described above, calling information (such as the dialing information and the internet service information) are transferred and received in parallel. The calling information is data on the D channel, and the internet service information is data on the B channel. Accordingly, the calling information and the internet service information have different respective paths.

Transmission and reception of facsimile data are as follows.

The facsimile data inputted via the scanning section 30 are provided to the serial input/output device 90 under the control of the CPU 10, and are transferred to a reception side facsimile device through the B channel of the ISDN in the same manner as transfer of the data to the internet service provider. That is, the facsimile data are transferred and received through the B channel at a transmission rate of 64 kbps.

The reception side facsimile device must be a facsimile device supporting G3C, G3F, and G4 types of protocol, which are used for connecting with the ISDN.

The calling information (such as the dialing information) is directly transferred to the ISAC 100 due to information on the D channel. The CPU 10 controls the ISAC 100 to perform identification of the protocols, such as the layer 1, 2 and 3 protocols, on the D channel. Furthermore, the CPU 10 controls the multifunctional apparatus so that it is connected with the reception side facsimile device through the ISDN. The facsimile data are transferred and received via the serial input/output device 90 and the ISDN line interfacing section 110.

Furthermore, the received facsimile data are transferred to the printing section 40 through the pixel converting section 60 under the control of the CPU 10. The printing section 40 prints the facsimile data.

As described above, since the multifunctional apparatus according to the present invention has a printing function, a scanning function, a facsimile data transferring function and a communicating function, there is an advantage in that a separate communication device is not required to communicate with the other communication apparatus by use of a computer.

Furthermore, the multifunctional apparatus supports not only the present protocol such as G3 but also such protocols as G3C and G3F, so as to transfer and receive the facsimile data through the ISDN.

As described above, since the communication by use of a computer and the transmission and reception of the facsimile data are performed through the ISDN without noise, there is another advantage in that distortion of the facsimile data is prevented.

Since the multifunctional apparatus according to the present invention supports a higher transmission rate than an analog type of modem, the communicating cost can be reduced. While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A multifunctional apparatus for transferring and receiving facsimile data and communication data by using an integrated service digital network (ISDN), comprising:

a computer interfacing section for receiving dialing information from a computer, and for transferring the facsimile data and the communication data to, and receiving the facsimile data and the communication data from, the computer;

a line interfacing section for transferring data to the integrated service digital network, and for receiving the facsimile data and the communication data from the integrated service digital network;

an ISDN subscriber access controller (ISAC) connected to said line interfacing section for performing layer 1, layer 2 and layer 3 protocols to control a connection with the integrated service digital network by using the dialing information, and for transferring the facsimile data and the communication data to, and receiving the facsimile data and the communication data from, the integrated service digital network at a first data transfer rate; and a serial input and output section connected between said computer interfacing section and is said ISAC for converting the communication data transmitted by the computer through the computer interfacing section, and facsimile data scanned in a scanning section, into serial data, and for transferring the serial data to the ISAC at a second data transfer rate, and for receiving and converting the communication data and facsimile data transmitted from the integrated service digital network through the ISAC into the serial data at the second data transfer rate.

2. A multifunctional apparatus as claimed in claim 1, wherein the first data transfer rate is substantially 64 kbps.

3. A multifunctional apparatus as claimed in claim 1, wherein the second data transfer rate is substantially 768 kbps.

4. A multifunctional apparatus as claimed in claim 1, further comprising a central processing unit connected to said serial input and output section for receiving an interrupt request therefrom when the serial data is received by said serial input and output section, said central processing unit controlling said serial input and output section to transfer the serial data to said computer interfacing section when the interrupt request is received from said serial input and output section.

5. A multifunctional apparatus as claimed in claim 1, further comprising a central processing unit connected to said serial input and output section for controlling reception of the facsimile data by said serial input and output section.

6. A multifunctional apparatus for transferring and receiving facsimile data and communication data by using an integrated service digital network (ISDN), comprising:

a computer interfacing section for receiving dialing information from a computer, and for transferring the facsimile data and the communication data to, and receiving the facsimile data and the communication data from, the computer;

a line interfacing section for transferring data to the integrated service digital network, and for receiving the facsimile data and the communication data from the integrated service digital network;

an ISDN subscriber access controller (ISAC) for performing layer 1, layer 2 and layer 3 protocols to control a connection with the integrated service digital network by using the dialing information, and for transferring the facsimile data and the communication data to, and receiving the facsimile data and the communication data from, the integrated service digital network at a first data transfer rate;

a serial input and output section for converting the communication data transmitted by the computer through the computer interfacing section, and facsimile data scanned in a scanning section, into serial data, and for transferring the serial data to the ISAC at a second data transfer rate, and for receiving and converting the communication data and facsimile data transmitted from the integrated service digital network through the ISAC into the serial data at the second data transfer rate; and a central processing unit connected to said ISAC for controlling said ISAC to perform identification of the layer 1, layer 2 and layer 3 protocols in response to reception of calling information by said ISAC.

7. A multifunctional apparatus as claimed in claim 1, wherein said ISAC receives the facsimile data from, and transmits the facsimile data to, the scanning section via said serial input and output section.

8. A multifunctional apparatus as claimed in claim 7, wherein said ISAC receives the facsimile data from, and transmits the facsimile to, the integrated service digital network via said line interfacing section.

9. A multifunctional apparatus as claimed in claim 1, wherein said ISAC receives the facsimile data from, and transmits the facsimile to, the integrated service digital network via said line interfacing section.

10. A multifunctional apparatus as claimed in claim 1, wherein said ISAC converts data received at the first data transfer rate from the integrated service digital network to the second data transfer rate, and converts data received at the second data transfer rate from the serial input and output section to the first data transfer rate.

11. A multifunctional apparatus for transferring and receiving facsimile data and communication data by using an integrated service digital network (ISDN), comprising:

computer interfacing means for receiving dialing information from a computer, and for transferring the facsimile data and the communication data to, and receiving the facsimile data and the communication data from, the computer;

serial input and output means connected to said computer interfacing means for converting the communication data transmitted from the computer through the computer interfacing means and facsimile data scanned in a scanning section into serial data for output at a first transfer rate;

ISDN subscriber access controller (ISAC) means connected to said serial input and output means for receiving said serial data at said first data transfer rate from said serial input and output means, and for converting said first data transfer rate of said serial data to a second data transfer rate;

line interface means disposed between said ISAC means and the integrated service digital network for conveying said serial data at the second data transfer rate to the integrated service digital network; and central processing unit means connected to said serial input and output means for controlling reception of the facsimile data by said serial input and output means.

12. A multifunctional apparatus as claimed in claim 11, wherein the first data transfer rate is substantially 768 kbps.

13. A multifunctional apparatus as claimed in claim 11, wherein the second data transfer rate is substantially 64 kbps.

14. A multifunctional apparatus as claimed in claim 11, further comprising a central processing unit connected to said ISAC means for controlling said ISAC means to perform identification of the layer 1, layer 2 and layer 3 protocols in response to reception of calling information by said ISAC means.

15. A multifunctional apparatus as claimed in claim 11, wherein said ISAC means receives the facsimile data from, and transfers the facsimile data to, the integrated service digital network via said line interface means.

16. A multifunctional apparatus as claimed in claim 15, wherein said ISAC means receives the facsimile data from, and transfers the facsimile data to, the scanning section via said serial input and output means.

17. A multifunctional apparatus as claimed in claim 11, wherein said ISAC means receives the facsimile data from, and transfers the facsimile data to, the scanning section via said serial input and output means.

18. A multifunctional apparatus for transferring and receiving facsimile data and communication data by using an integrated service digital network (ISDN), comprising:

line interface means connected to the integrated service digital network for receiving the facsimile data and the communication data therefrom at a first data transfer rate;

ISDN subscriber access controller (ISAC) means for receiving the facsimile data and the communication data from the line interface means, for converting the first data transfer rate to a second data transfer rate, and for providing the facsimile data and the communication data as a serial data output at the second data transfer rate;

serial input and output means for receiving the serial data output of said ISAC means, and providing it as an output; and computer interfacing means for receiving and transferring the output of said serial input and output means as the facsimile data and the communication data provided to a computer;

wherein said ISAC means receives the facsimile data from, and transmits the facsimile data to, a scanning unit via said serial input and output means.

19. A multifunctional apparatus as claimed in claim 18, wherein the first data transfer rate is substantially 64 kbps.

20. A multifunctional apparatus as claimed in claim 18, wherein the second data transfer rate is substantially 768 kbps.

21. A multifunctional apparatus as claimed in claim 18, further comprising a central processing unit connected to said serial input and output means for receiving an interrupt request therefrom when the serial data output is received by said serial input and output means, said central processing unit controlling said serial input and output means to transfer the serial data output to said computer interfacing means when the interrupt request is received from said serial input and output means.

22. A multifunctional apparatus as claimed in claim 18, further comprising a central processing unit connected to said serial input and output means for controlling reception of the facsimile data from a scanning unit by said serial input and output means.

23. A multifunctional apparatus as claimed in claim 18, further comprising a central processing unit connected to said ISAC means for controlling said ISAC means to perform identification of layer 1, layer 2 and layer 3 protocols in response to reception of calling information by said ISAC means.

* * * * *